Figure 1:
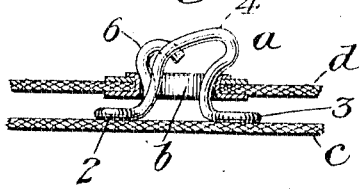

J. H. FISHER.
FASTENER.
APPLICATION FILED OCT. 20, 1913.

1,096,898.  Patented May 19, 1914.

Witnesses.
D. W. Edelin
V. T. Houghton

Inventor.
John H. Fisher
By Annie Goldsborough O'Neill
Attys.

UNITED STATES PATENT OFFICE.

JOHN H. FISHER, OF WASHINGTON, DISTRICT OF COLUMBIA.

FASTENER.

1,096,898.

Specification of Letters Patent.  Patented May 19, 1914.

Application filed October 25, 1913. Serial No. 797,213.

*To all whom it may concern:*

Be it known that I, JOHN H. FISHER, a citizen of the United States, and resident of Washington, in the District of Columbia, have invented certain new and useful Improvements in Fasteners; and I do hereby declare the following to be a full, clear, and exact description of the invention, such as will enable others skilled in the art to which it appertains to make and use the same.

The invention relates to separable fastening devices, such as are commonly used for gloves, articles of apparel, tent flies, vehicle curtains and the like, involving a stud member and a coöperating socket member attached to the meeting edges of the article to be fastened.

In my pending application, Serial No. 741,964, filed January 14, 1913, a fastener is disclosed comprising stud and socket members, one of which is inherently resilient at its zone of engagement with the other member, so that it is capable of being deformed under slight pressure when the parts are being engaged or disengaged, the stud member having a head adapted to enter the socket and to be held by the socket, said head having an enlargement on one side thereof adapted to so engage the socket as to prevent initial separation of the stud and socket sections at the point of enlargement of the head, so that disengagement of the parts can be effected only by a relative lifting movement between the head and socket initiated at the side of the head opposite the enlargement thereon. This construction while admitting of an intentional engagement and disengagement of the parts of the fastener with as great expedition and facility as characterize the standard types of such fasteners now in use, nevertheless, effectively precludes the accidental separation or unlocking of the parts after they have been once engaged.

The object of the present invention is to provide a fastener having the general characteristics of that disclosed in the pending application referred to, but of modified form.

More specifically, the object is to provide a fastener which may be manufactured at a minimum cost, be simple in construction and yet have the advantages above mentioned.

With these objects in view, the invention consists in forming the stud member of wire and producing the lateral enlargement of the head simply by bending the wire to the proper configuration at the desired places.

The invention further consists in utilizing a portion of the wire to constitute a resilient socket retaining part, preferably formed by so bending the wire as to produce an extension which projects beyond the contour of the head and which is directed oppositely to the first and main extension of the head.

Figure 2:
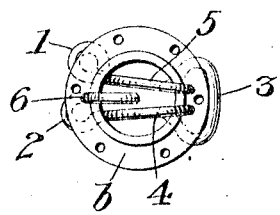
Figure 3:
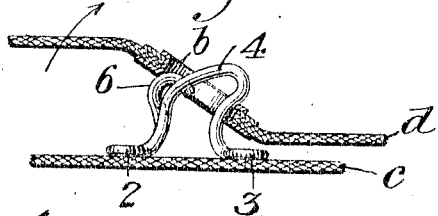
Figure 4:
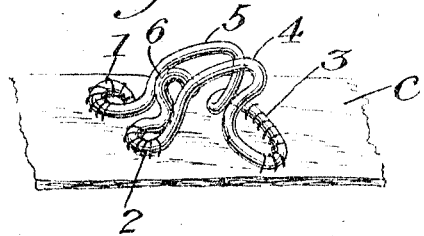
Figure 5:
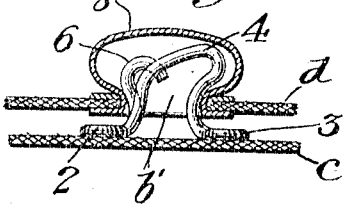

The invention is illustrated in the accompanying drawing, in which,

Figure 1 is a side elevation, partly in section, of coöperating stud and socket members constructed in accordance with the invention; Fig. 2 is a plan view of the fastener shown in Fig. 1; the material to which the fastener is secured being omitted for the sake of clearness; Fig. 3 is a view similar to Fig. 1, showing the operation required to separate the two members of the fastener; Fig. 4 is a perspective view of the stud members applied to a piece of fabric or the like; and Fig. 5 is a view similar to Fig. 1, showing a different form of socket member applied to the stud.

As shown in the drawings, the stud member $a$ is made of wire so bent as to form a base portion adapted to be fastened to the material $c$ by sewing or otherwise, and a neck and head portion having the lateral enlargement heretofore referred to. These parts of the stud member may be conveniently formed by bending the wire as shown, to wit, to form the loop portions 1, 2 and 3 constituting the base of the stud and the loop portions 4 and 5 constituting the neck and head of the stud.

Starting at the end of the wire which forms the loop 1, for instance, (Fig. 4), the wire is bent to form said loop 1 and then bent upwardly and laterally to form the loop 5 having the general shape shown in the drawings. A further bend in the wire forms the loop 3 which coöperates with the loops 1 and 2 to constitute a good supporting surface for the stud member. A loop 4, identical with loop 5, is then formed by bending the wire to the same configuration as loop 5. The last supporting loop 2 is then formed and the extremity of the wire is bent toward the head and so shaped as to form a resilient extension, which projects beyond the contour of the head to form a resilient catch 6 for the socket, as clearly shown in the drawing.

The socket member *b* may be of any desired construction. In Fig. 1 an annular ring-like socket is shown secured to the material *d* that is to be fastened by means of the coöperating stud and socket members to the material *c*. In Fig. 5 a socket member *b'* is shown having a cap portion 8 which incloses the stud member when the socket is applied to the same.

In applying the stud member *a* to the flap of the article to be fastened, the enlargement or lateral extension of the head is directed toward the edge of the flap. By this arrangement, the only application of force to disengage the stud from the socket must be applied, so as to cause the socket to rock over the head of the stud from the side opposite the enlargement on the head of the stud. This movement is exemplified in Fig. 3 in which the left-hand edge of the upper flap is lifted, thereby causing the socket to turn on the head of the stud. When this movement is applied to the fastener, the resilient extension or catch 6 will yield and permit the socket member to be entirely removed from the stud member. When a force tending to swing the socket in the reverse direction, with respect to the head, is applied, the enlargement or extension of the head is effective to prevent any separation of the parts at this point. It will be seen, therefore, that when a fastener of the type indicated is applied to the flaps of an article to be joined, the action of the projection or enlargement of the head is to securely lock the parts together and positively prevent the initiation of a separating movement of the elements of the fastener at or in the vicinity of said enlargement and that separation of the parts of the fastener can only be effected by a movement tending to disengage the stud and socket member at a point on the side of the head opposite the extension or enlargement. The projection or enlargement, however, does not in any way interfere with the action of engaging the stud and socket members of the fastener, but, on the contrary, facilitates such engagement, for it will be seen that if the socket member is tilted as in Fig. 3, so that the enlargement enters the eyelet opening of the socket first, the particular shape and arrangement of the projection serves to accurately guide the stud member into the socket.

Obviously, the invention is not limited to the specific construction shown in the drawing, since the stud member may be formed in numerous ways without departing from the scope of the invention, as defined in the accompanying claims.

What I claim is:—

1. A separable fastener comprising a stud member and a coöperating socket member, said stud member made of wire bent to form a head portion having a laterally extended enlargement at one side thereof, and a resilient laterally extending portion at the opposite side thereof extending beyond the contour of the head to constitute resilient socket retaining means.

2. A separable fastener comprising a stud member and a coöperating socket member, said stud member made of a continuous length of wire bent to form a base portion, a head portion having a laterally extended enlargement at one side thereof, and a resilient lateral extension at the opposite side extending beyond the contour of the head.

3. A separable fastener comprising a stud member and a coöperating socket member, said stud member made of a continuous length of wire, a portion of said wire being bent to form a plurality of loops constituting a base portion, and a plurality of loops directed upwardly from said base portion, said last-named loops having laterally extended enlargements at one side thereof, and another portion of said wire being bent to form a resilient extension protruding beyond the contour of said upwardly directed loops.

In testimony whereof I affix my signature, in presence of two witnesses.

JOHN H. FISHER.

Witnesses:
    ARTHUR L. BRYANT,
    CHAS. J. O'NEILL.